United States Patent [19]

Fukuda et al.

[11] Patent Number: 5,459,743
[45] Date of Patent: Oct. 17, 1995

[54] ADDRESS DECISION SYSTEM HAVING ADDRESS CHECK SYSTEM

[75] Inventors: Naoki Fukuda, Fukuoka; Shuji Yoshimura; Satoshi Kakuma, both of Kawasaki, all of Japan

[73] Assignee: Fujitsu Limited, Kawasaki, Japan

[21] Appl. No.: 275,306

[22] Filed: Jul. 15, 1994

Related U.S. Application Data

[63] Continuation of Ser. No. 935,391, Aug. 26, 1992, abandoned.

[30] Foreign Application Priority Data

Aug. 30, 1991 [JP] Japan ................................. 3-220180

[51] Int. Cl.[6] ............................................. H04L 12/56
[52] U.S. Cl. ............................................. 371/67.1; 370/94.1
[58] Field of Search ................................ 371/67.1, 68.1; 370/94.1, 60, 13

[56] References Cited

U.S. PATENT DOCUMENTS

| | | | |
|---|---|---|---|
| 5,274,641 | 12/1993 | Shobatake et al. | 370/94.1 |
| 5,287,349 | 2/1994 | Hyodo et al. | 370/60.1 |
| 5,301,184 | 4/1994 | Uriu et al. | 370/16 |
| 5,369,649 | 11/1994 | Murayama | 371/37.1 |

Primary Examiner—Robert W. Beausoliel, Jr.
Assistant Examiner—Glenn Snyder
Attorney, Agent, or Firm—Staas & Halsey

[57] ABSTRACT

In an address decision system in an ATM exchange, a table memory stores data showing relationships between VPI/VCI values and addresses. A latch circuit latches a VPI/VCI value contained in a cell transferred via a cell highway. A comparator circuit compares the VPI/VCI values stored in the table memory with the VPI/VCI value latched by the latch and generates a comparator output signal showing, in a normal operation, one of the addresses at which the VPI/VCI value from the latch circuit coincides with one of the VPI/VCI values in the table memory. An address decision unit encodes the comparator output signal and generates an encoded signal based on the comparator output signal. A decoder unit decodes the encoded signal and generates a decoded signal. A check unit receives the comparator output signal and the encoded signal and generates an error signal when the comparator output signal and the encoded signal do not match each other.

12 Claims, 11 Drawing Sheets

FIG. 5

| m | $2^4$ | $2^3$ | $2^2$ | $2^1$ | $2^0$ |
|---|---|---|---|---|---|
| n | 16~31 | 8(2p+1)+0<br>8(2p+1)+1<br>8(2p+1)+2<br>8(2p+1)+3<br>8(2p+1)+4<br>8(2p+1)+5<br>8(2p+1)+6<br>8(2p+1)+7 | 4(2q+1)+0<br>4(2q+1)+1<br>4(2q+1)+2<br>4(2q+1)+3 | 2(2r+1)+0<br>2(2r+1)+1 | 2S+1 |
| | | p=0~3 | q=0~3 | r=0~7 | s=0~15 |

ADDRESS DECISION SYSTEM HAVING ADDRESS CHECK SYSTEM

This application is a continuation of application Ser. No. 07/935,391, filed Aug. 26, 1992, now abandoned.

BACKGROUND OF THE INVENTION

1. Field of the Invention

The present invention generally relates to an exchange in a B-ISDN (Broad-band Integrated Services Digital Network), and more particularly to an address decision system having an address check system for determining whether or not an error is contained in an address signal output by the address check system.

2. Description of the Prior Art

In the B-ISDN, the unit of communications is an ATM (Asynchronous Transfer Mode) cell which contains information to be transferred. Each ATM cell is managed using routing information (tag information) and policing information. The routing information is used for routing the ATM cell being considered; policing information is used for defining a frequency band within which the ATM cell being considered is transferred. The routing information and the policing information are managed in a VPI/VCI (Virtual Path Identifier/Virtual Channel Identifier) unit or segment. The VPI/VCI is one of the elements which form the ATM cell.

FIG. 1 shows a format of an ATM cell prescribed in the CCITT Recommendation I. 361, the disclosure of which is hereby incorporated by reference. The ATM cell consists of 53 bytes. FIG. 1(a) shows the format of the entire ATM cell, and FIG. 1(b) shows a 48-byte information field contained in the ATM cell. The above-mentioned VPI/VCI segment is one of the elements which form an ATM header which is concatenated to the information field. As shown in FIG. 2, 16-bit tag information TAG is concatenated to the leading end of the ATM cell. The tag information represents routing information for switching the ATM cell.

Data management in the VPI/VCI unit is carried out, at the time of setting up a call, by writing the VPI/VCI segment of the above call into a VPI/VCI table memory. When the call is released, the VPI/VCI of the call is deleted from the VPI/VCI table memory under control of a call processor (not shown). Information can be managed on the basis of address information concerning the VPI/VCI table memory. Hence, information can be substantially managed in the VPI/VCI unit. The address of the VPI/VCI table memory can be obtained by the VPI/VCI of the cell by use of hardware, without software. This contributes to speeding up cell processing.

FIG. 3 shows an address decision system in an ATM exchange. The address decision system comprises a VPI/VCI latch circuit 2, a VPI/VCI table memory 3, a simultaneous comparator circuit 4, and an address decision circuit 5. The VPI/VCI latch circuit 2, which is connected to a cell highway 1, extracts a VPI/VCI from each cell transferred via the cell highway 1, and latches it therein. The VPI/VCI table memory 3 stores the VPI/VCI value of cells which is set at the time of setting up a call. More specifically, the VPI/VCI table memory 3 stores addresses and VPI/VCI values specified by the addresses. It will now be assumed that n pieces of data (n VPI/VCI values) are stored in the VPI/VCI table memory 3.

The comparator circuit 4 simultaneously compares all the VPI/VCI values stored in the VPI/VCI table memory 3 with the VPI/VCI value latched in the VPI/VCI latch circuit 2. The address decision circuit 5 executes an address encoding process using output signals of the comparator circuit 4. The encoded address output by the address decision circuit 5 consists of m bits. The m-bit encoded address serves as an address signal of predetermined table memories (not shown).

During operation, the VPI/VCI latch circuit 2 extracts the VPI/VCI value from the cell transferred via the cell highway 1, and latches it therein. The comparator circuit 4 compares the VPI/VCI value latched in the latch circuit 2 with all the VPI/VCI values stored in the VPI/VCI table memory 3. This simultaneous comparison process contributes to speeding up cell processing.

The VPI/VCI table memory 3 stores one VPI/VCI value specified by one address. Hence, only one of the n comparison results output by the comparator circuit 4 shows address matching. The address decision circuit 5 encodes the n bits output by the comparator circuit 4, and generates the encoded address signal consisting of m bits. The m-bit address signal is used as an address signal for accessing predetermined table memories (not shown).

If there is no fault or error, only one of the n bits output by the comparator circuit 4 shows the address matching. However, due to a fault occurring in the network, the address decision circuit 5 may generate an erroneous output signal. For example, a plurality of bits among the n bits from the comparator circuit 4 may show the address matching. The conventional address decision system shown in FIG. 3 does not have any means for detecting whether or not the m-bit address signal has an error.

SUMMARY OF THE INVENTION

It is a general object of the present invention to provide an address decision system having an address check system in which the above disadvantage is eliminated.

A more specific object of the present invention is to provide an address decision system having an address check system capable of indicating that an error is contained in an encoded address signal generated by the address decision system.

The above objects of the present invention are achieved by an address decision system in an ATM exchange, comprising: table memory means for storing data showing relationships between VPI/VCI values and addresses; latch means, coupled to a cell highway, for latching a VPI/VCI value contained in a cell transferred via the cell highway; comparator means, coupled to the table memory means and the latch means, for comparing the VPI/VCI values stored in the table memory means with the VPI/VCI value latched by the latch means and for generating a comparator output signal showing, in a normal operation, one of the addresses at which the VPI/VCI value from the latch means coincides with one of the VPI/VCI values in the table memory means; address decision means, coupled to the comparator means, for encoding the comparator output signal and for generating an encoded signal based on the comparator output signal; decoder means, coupled to the address decision means, for decoding the encoded signal and generating a decoded signal; and check means, coupled to the comparator means and the decoder means, for receiving the comparator output signal and the encoded signal and for generating an error signal when the comparator output signal and the encoded signal do not match each other.

BRIEF DESCRIPTION OF THE DRAWINGS

Other objects, features and advantages of the present invention will become more apparent from the following detailed description when read in conjunction with the accompanying drawings, in which:

FIG. 5 is a diagram illustrating grouping of table memory addresses;

DESCRIPTION OF THE PREFERRED EMBODIMENTS

Figure 1:
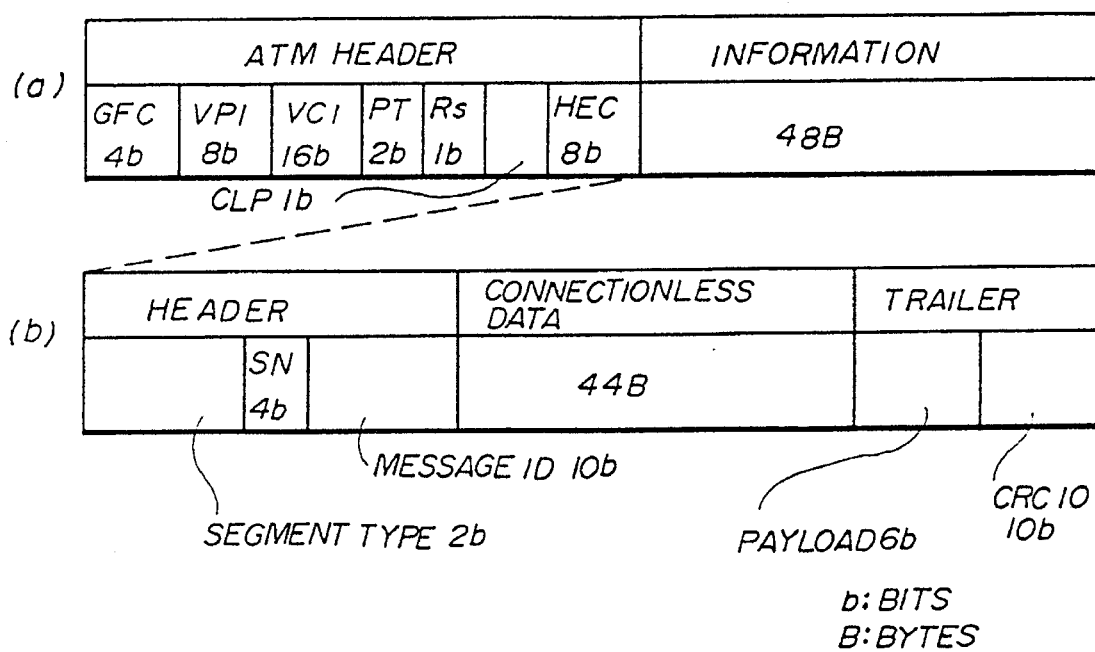
FIG. 1 is a diagram showing an ATM cell format.
Figure 2:
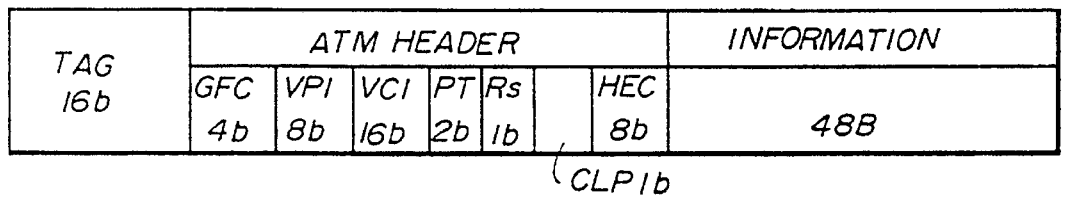
FIG. 2 is a diagram showing an ATM cell format with tag information added thereto.
Figure 3:
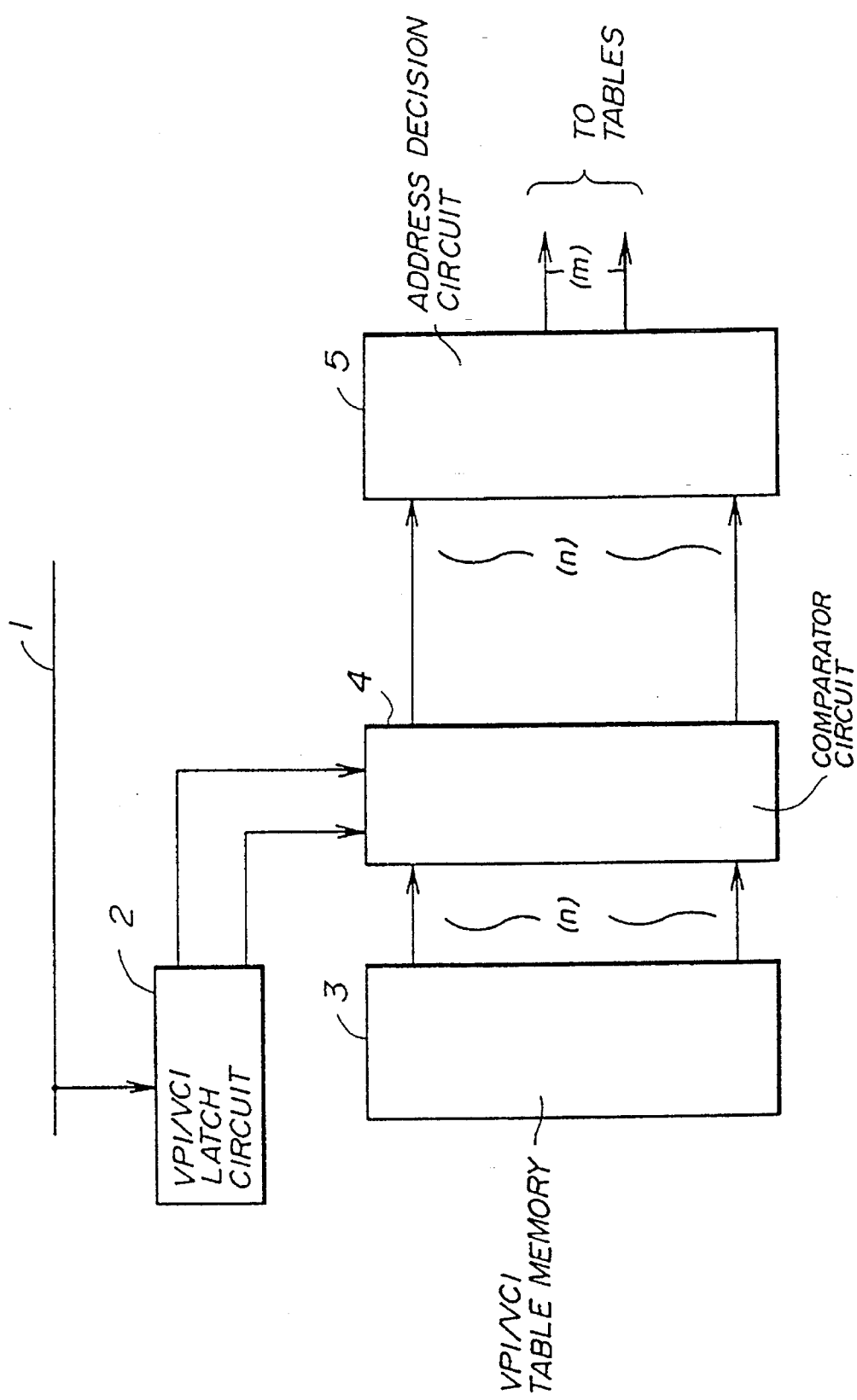
FIG. 3 is a block diagram of a conventional address decision system provided in an ATM exchange.
Figure 4:
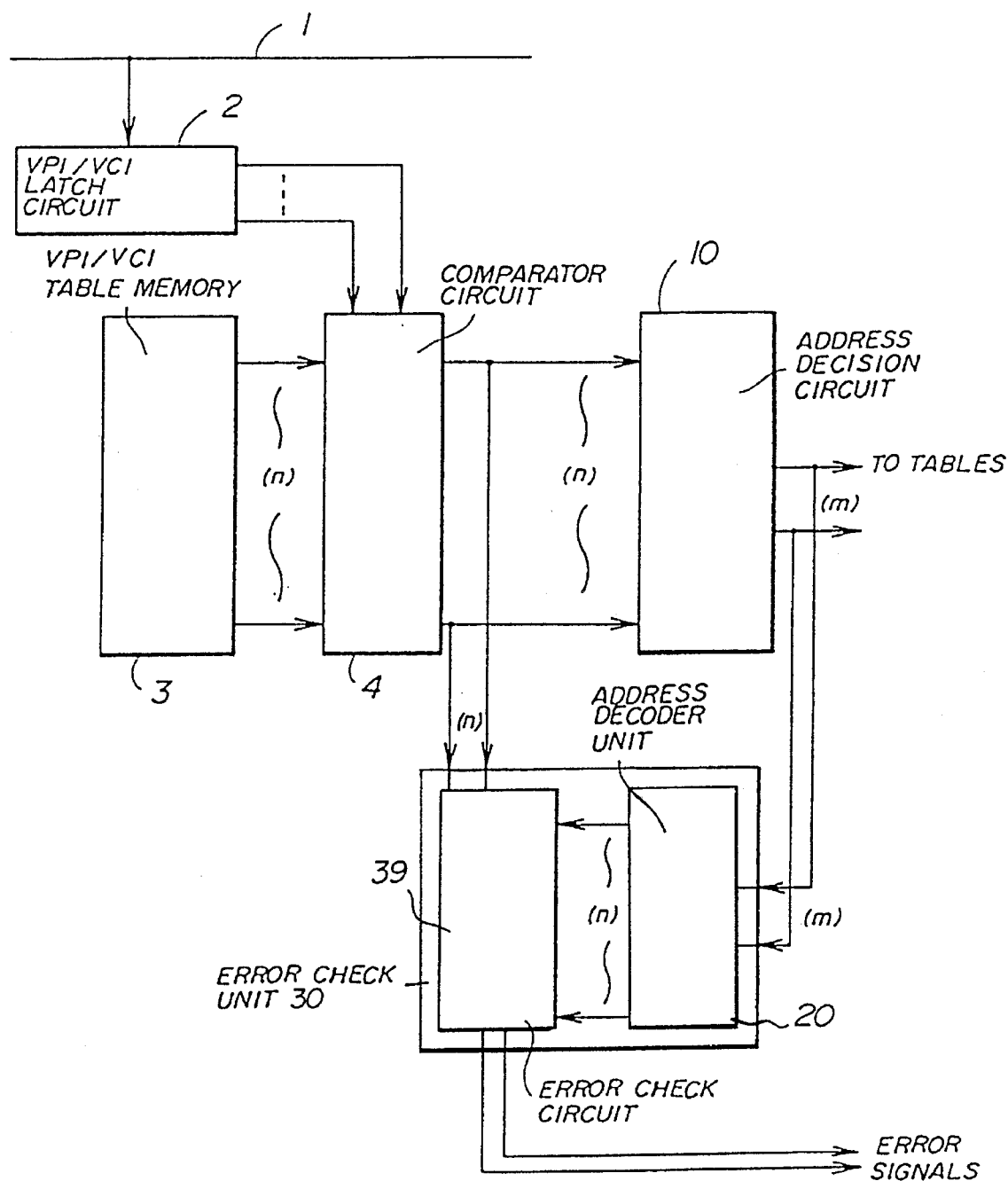
FIG. 4 is a block diagram showing an overview of the present invention.

FIG. 4 shows an overview of an embodiment of the present invention. In FIG. 4, parts that are the same as parts shown in FIG. 3 are given the same reference numerals as previously. An error check unit 30 according to an embodiment of the present invention comprises an address decoder unit 20 and an error check unit 39. An address decision circuit or encoding means 10 is substituted for the address decision circuit 5 shown in FIG. 3. The address decoder unit 20 decodes the m-bit encoded signal output by the address decision circuit 10 into a decoded signal consisting of n bits. The error check unit 39 compares the n bits output by the address decoder unit 20 with the n bits output by the comparator circuit 4 in order to determine whether or not an address error has occurred. Then, the error check unit 30 generates two (first and second) error signals, as will be described in detail later.

If two or more bits among the n bits output by comparator circuit 4 show address matching, the address decision circuit or encoding unit 10 generates the encoded signal having an error based on the two or more address matches obtained for the two or more addresses. Only one of the n bits output by the address decoder unit 20 is, for example, "0" (low active) without exception. Even if the address decoder unit 20 receives the erroneous m-bit encoded signal from the address decision circuit 10, it generates the n-bit decoded signal in which only one bit is "0" (active). The error check circuit 4 receives the n bits from the comparator circuit 4 having two or more bits showing address matching, and the n bits from the address decoder unit 20 having only one low-active bit. In this case, the error check circuit 4 generates a first error signal. If the n bits output by the comparator circuit 4 do not show address matching at all, the error check unit 30 generates a second error signal, as will be described later.

The details of the address decision circuit 10 will now be described. The comparator circuit 4 generates the n bits each time it receives the VPI/VCI value, i.e., each time a cell is received. It will now be assumed that the comparator circuit 4 generates "0" when the VPI/VCI values match each other, and "1" when they do not match each other. It will also be assumed that VPI/VCI table memory 3 has 32 addresses (n =32). In other words, the VPI/VCI table memory 3 is capable of storing 32 VPI/VCI values. Normally, only one of the n bits output by the comparator circuit 4 is "0", and the address matching is obtained at an address related to the above one bit.

It is possible to express 32 addresses by five bits, $2^4$ - $2^0$. The addresses of the VPI/VCI table memory 3 is grouped for each of the five bits. This grouping of the addresses is based on whether a bit being considered should be "0" or "1" for a table address being considered. In the embodiment being considered, the address decision circuit 10 is configured based on addresses which set a bit being considered to be "1".

FIG. 5 shows grouping of the addresses of the VPI/VCI table memory 3. In FIG. 5, "m" denotes bits obtained by encoding addresses n, and "n" denotes addresses of the VPI/VCI table memory 3 which set m to be "1". The addresses n are expressed in decimal notation.

The bit $2^4$ necessarily assumes "1" when the address n is equal to any of 16–31.

The bit $2^3$ is necessarily "1" when the address n is any of the following values:

8(2p+1)+0
8(2p+1)+1
8(2p+1)+2
8(2p+1)+3
8(2p+1)+4
8(2p+1)+5
8(2p+1)+6
8(2p+1)+7
where p=0, 1.

When p=0, the addresses are equal to 8, 9, 10, 11, 12, 13, 14 and 15. When p=1, the addresses are equal to 24, 25, 26, 27, 28, 29, 30 and 31. That is, when the address n is any of the above values, the bit $2^3$ is necessarily "1".

The bit $2^2$ necessarily assumes "1" when the address n is equal to any of the following values:

4(2q+1)+0
4(2q+1)+1
4(2q+1)+2
4(2q+1)+3
where q=0, 1, 2, 3.

When q=0, the addresses are equal to 4, 5, 6 and 7, and when q=1, the addresses are equal to 12, 3, 14 and 15. When q=2, the addresses are equal to 20, 21, 22 and 23, and when q=3, the addresses are equal to 28, 29, 30 and 31. That is, when the address n is any of the above values, the bit $2^2$ is necessarily "1".

The bit $2^1$ necessarily assumes "1" when the address n is any of the following values:

2(2r+1)+0
2(2r+1)+1
where r=0, 1, 2, 3, 4, 5, 6, 7.

The addresses are equal to 2 and 3 for r=0, and 6 and 7 for r=1. The addresses are equal to 10 and 11 for r=2, and 14 and 15 for r=3. The addresses are 18 and 19 for r=4, and 22 and 23 for r=5. The addresses are 26 and 27 for r=6, and 30 and 31 for r =7. That is, when the address n is any of the above values, the bit $2^1$ is necessarily "1".

The bit $2^0$ necessarily assumes "1" when the address n is any of the following values:

2s+1 where s=0–15.

In this case, the addresses are equal to 1, 3, 5, 7, 9, 11, 13, 15, 17, 19, 21, 23, 25, 27, 29, and 31.

The address decision circuit 10 encodes the matching address indicated by the corresponding bit having "0", by referring to the table memory shown in FIG. 5. For example, when the matching address output by the comparator circuit 4 is equal to 29, the five bits output by the address decision circuit 10 are obtained so that $2^4$, $2^3$, $2^2$, $2^1$ and $2^0$ are respectively "1", "1", "1", "0" and "1".

Figure 6:
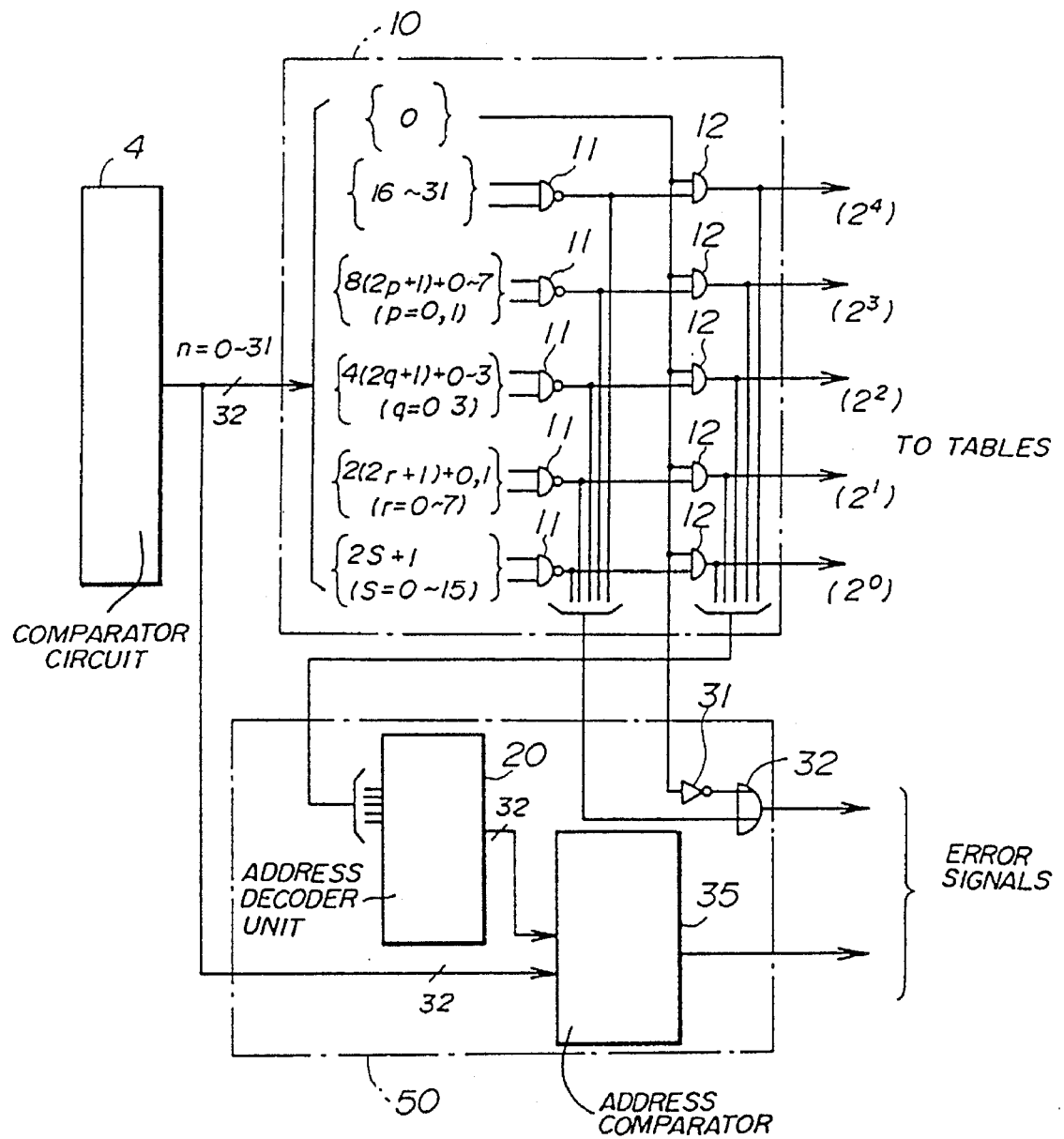
FIG. 6 is a block diagram of an address decision system having an address check system according to an embodiment of the present invention.

FIG. 6 shows the details of the address decision unit 10 and an error check unit 50. The error check unit 50 comprises an inverter 31, a multi-input OR gate 32, and an address comparator 35 in addition to the address decoder unit 20. The inverter 31, the OR gate 32 and the address comparator 35 form the error check circuit 39 shown in FIG. 4. The address decision circuit 10 comprises five multi-input NAND gates 11, and five two-input AND gates 12. One of the two input terminals of each of the AND gates 15 receives a comparator output bit generated by the comparator circuit 4 and related to an address of 0. Five output signals of the AND gates 12 form the m-bit (five-bit) output signal of the address decision circuit 10.

The NAND gate 11 related to the bit $2^4$ receives the 16th–31st comparator output bits which are output by the comparator circuit 4 and related to addresses of 16–31, respectively. The NAND gate 11 related to the bit $2^3$ receives the comparator output bits which set the bit $2^3$ to be "1". The NAND gate 11 related to the bit $2^2$ receives the comparator output bits which set the bit $2^2$ to be "1". The NAND gate 11 related to the bit $2^1$ receives the comparator output buts which set the bits $2^1$ to be "1". The NAND gate 11 related to the bit $2^0$ receives the comparator output bits which set the bit $2^0$ to be "1".

The five output bits generated by the address decision circuit 10 are applied to the address decoder unit 20. The five output bits respectively generated by the NAND gates 11 are applied to the OR gate 32 of the error check unit 50. The comparator output bit related to address 0 is applied to the OR gate 32 via the inverter 31. The address decoder unit 20 decodes the five-bit signal into a 32-bit signal. The 32 bits output by the address decoder unit 20 are applied to the address comparator 35. The address comparator 35 comprises exclusive-OR gates.

Figure 7:
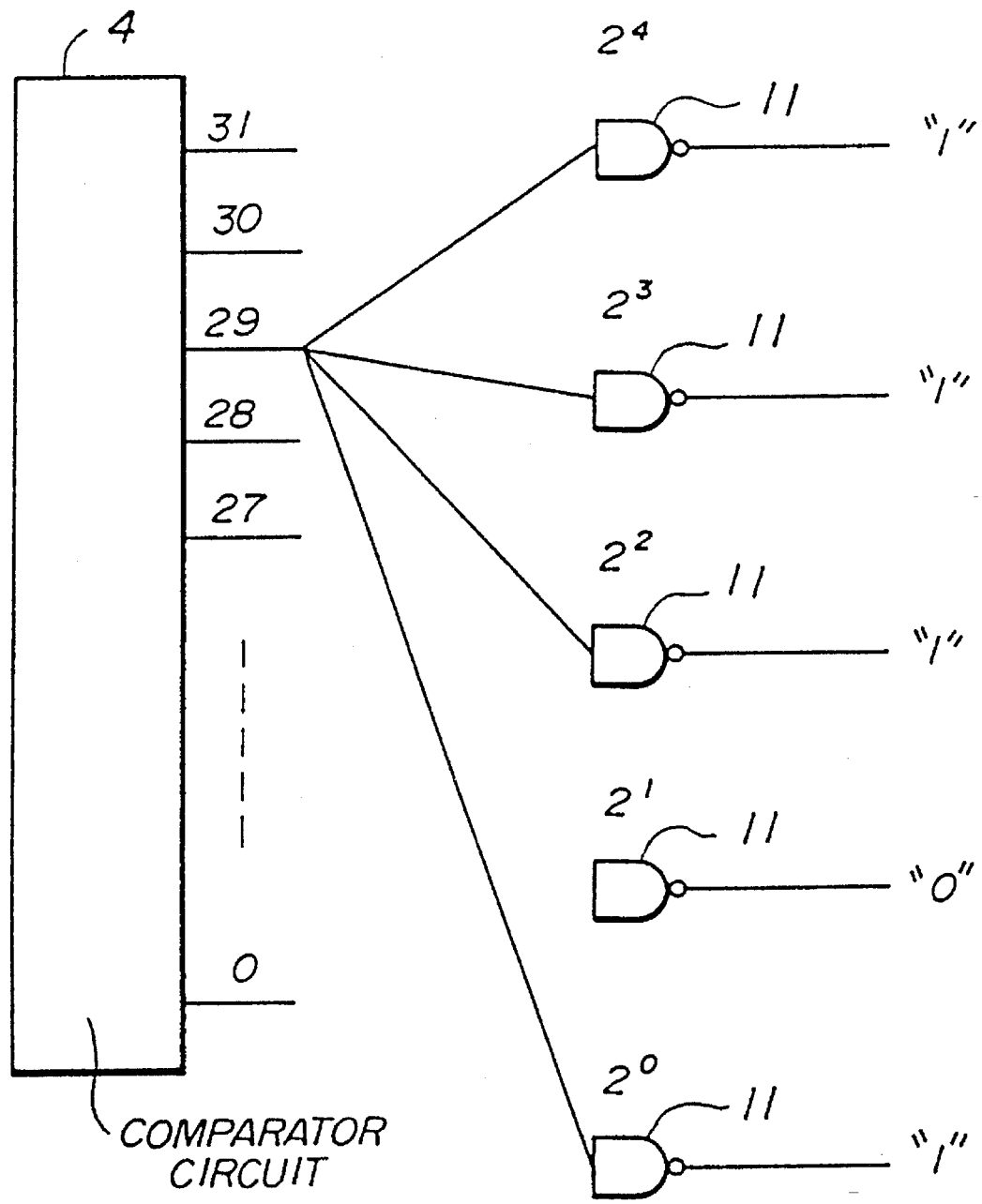
FIG. 7 is a block diagram showing the operation of an address decision circuit shown in FIG. 6 when n is equal to 29.

The operation of the configuration shown in FIG. 6 will now be described. The 32 output bits from the comparator circuit 4 are applied to the address decision circuit 10 and the address comparator 35. If there is no error, only one of the 32 output bits generated by the comparator circuit 4 is "0". The address decision circuit 10 encodes the address n related to the above one output bit equal to "0" in the manner previously described with reference to FIG. 5. More specifically, the address decision circuit 10 encodes the address n by determining whether or not the address n being considered satisfies the conditions defined for the respective bits $2^4$ - $2^0$. For example, when n=29, the five NAND gates 11 operate, as shown in FIG. 7. Only the 29th output bit of the comparator circuit 4 is "0" in the normal state, and the other output bits thereof are "1". The five bits respectively output by the five NAND gates 11 are applied to the respective AND gates 12. When n=29, only the AND gate 12 related to the bit $2^1$ is "0".

It will now be assumed that two or more output bits of the comparator circuit 4 are "0". The address decision circuit 10 encodes the 32 output bits in which a bit that should have been "0" is "1" due to an error.

The address decoder unit 20 decodes the five bits from the AND gates 12 into the corresponding 32-bit signal. As has been described previously, the address decoder unit 20 generates the 32 bits so that only one of the 32 bits is "0". The address comparator 35 compares the 32 bits from the address decoder unit 20 with the 32 bits from the comparator circuit 4. When there is an error, two or more bits among the 32 bits generated by the comparator circuit 4 are "0". In this case, the address matching does not stand, and hence the address comparator 35 generates the first error signal indicating address mismatch.

For example, if the two output bits of the comparator circuit 4 related to addresses 16 and 5 are "0", the bits of the NAND gates 11 (AND gates 12) related to the bits $2^4$, $2^2$ and $2^0$ are "1". That is, the address decision circuit 10 generates a 5-bit encoded output signal "10101". The address decoder unit 20 decodes "10101" and generates a decoded output signal indicating address 21. Meanwhile, the comparator circuit 4 outputs "0" at the two bits respectively related to addresses 16 and 5. Hence, the address comparator 35 outputs the first error signal.

It will be noted that there is no case where all the 32 bits output by the comparator circuit 4 are "0" except for a case where the address matching is made for address 0. In other words, it is necessary to output an error signal if the address matching is not made for the 32 addresses at all. For this purpose, the output bit of the comparator circuit 4 related to address 0 is applied to all the AND gates 12, and further applied to the OR gate via the inverter 31. When all the 32 bits output by the comparator circuit 4 are "0", the OR gate 32 generates the aforementioned second error signal.

In the above-mentioned manner, it is possible to detect an error in which the address output by the address decision circuit 10 is different from an address to be obtained, and an error in which there is not an address to be obtained.

Figure 8:
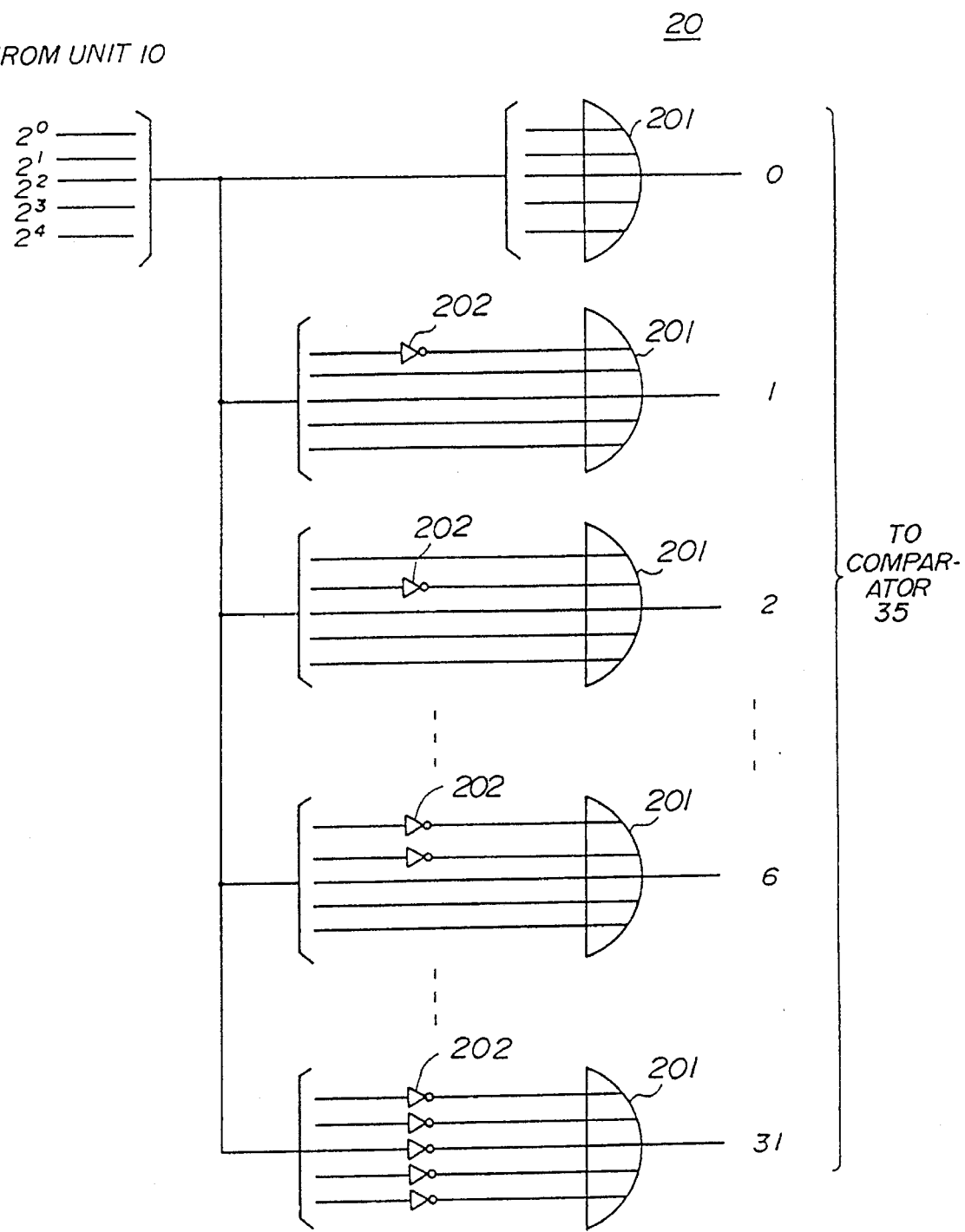
FIG. 8 is a circuit diagram of an address decoder unit shown in FIG. 6.

FIG. 8 is a circuit diagram of the address decoder unit 20. As has been described previously, the address decoder unit 20 decodes the five-bit signal from the address decision circuit 10 into the corresponding 32-bit signal. As shown in FIG. 8, the address decoder unit 20 comprises 32 five-input OR gates 201. The OR gate 201 related to address 0 directly receives the five bits from the address decision circuit 10. The OR gate 201 related to address 1 receives the bit $2^0$ via an inverter 202, and directly receives the remaining four bits. The OR gate 201 related to address 2 receives the bit $2^1$ via an inverter 202, and directly receives the remaining four bits. The OR gate 201 related to address 31 receives all the bits $2^0$ - $2^4$ via respective inverters 202. In this manner, the address decoder unit 20 executes the reverse of the encoding operation executed by the address decision circuit 10.

Figure 9:
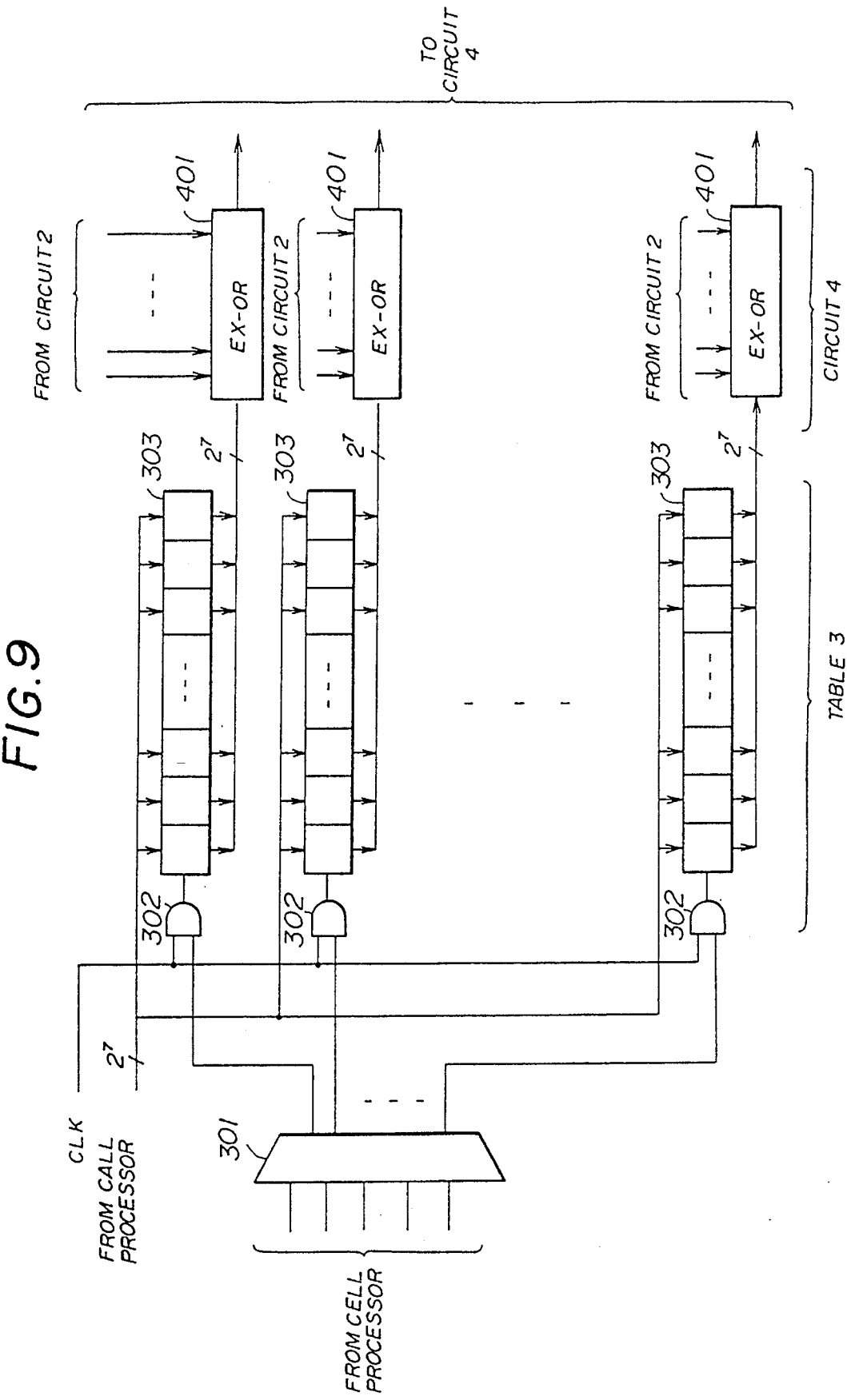
FIG. 9 is a block diagram showing a VPI/VCI table memory and a simultaneous comparator circuit shown in FIG. 4.

FIG. 9 shows the details of the VPI/VCI table memory 3 and the comparator circuit 4 shown in FIG. 4. The VPI/VCI table memory 3 comprises a decoder 301, 32 AND gates 302, and 32 32-bit registers 303. The decoder 301 decodes a five-bit address signal generated by a call processor which will be described later. The 32 AND gates 302 receive respective output signals of the decoder 301. A clock signal CLK, generated by a timing generator (not shown) built into the call processor or provided separately from the call processor, is applied to the 32 registers 303. A VPI/VCI value generated by the call processor is written into one of the registers 303 selected by the decoder 301. In this manner, 32 VPI/VCI values can be respectively written into the 32 registers 303.

The comparator circuit 4 comprises 32 exclusive-OR (EX-OR) gates 401, each of which receives the 32 bits output by the VPI/VCI latch circuit 2. Each of the exclusive-OR gates 401 generates "0" when the 32 bits from the corresponding register 303 coincide with the 32 bits from the VPI/VCI latch circuit 2. In other cases, each of the exclusive-OR gates 401 generates "1". In this manner, the comparator circuit 4 generates the 32-bit output signal, which is applied to the address decision circuit 10 and the error check unit 30.

Figure 10:
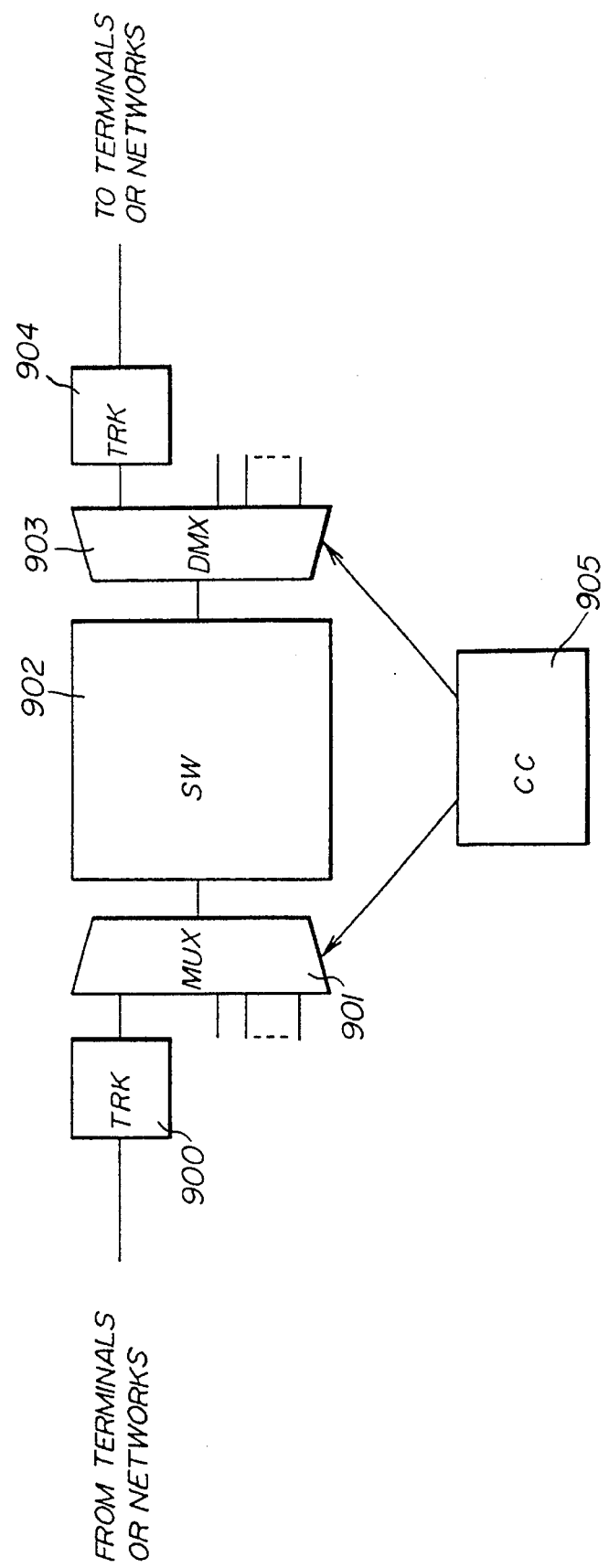
FIG. 10 is a block diagram of an ATM exchange to which the present invention is applied.

FIG. 10 is a block diagram of an ATM exchange to which the present invention is applied. The ATM exchange shown in FIG. 10 comprises incoming trunks TRK 900, a multiplier MUX 901, a switch SW 902, a demultiplexer DMX 903, outgoing trunks TRK 904, and a call processor CC 905. The present invention can be provided in the incoming trunks TRK 900 and/or the multiplexer MUX 901, as will be described below.

Figure 11:
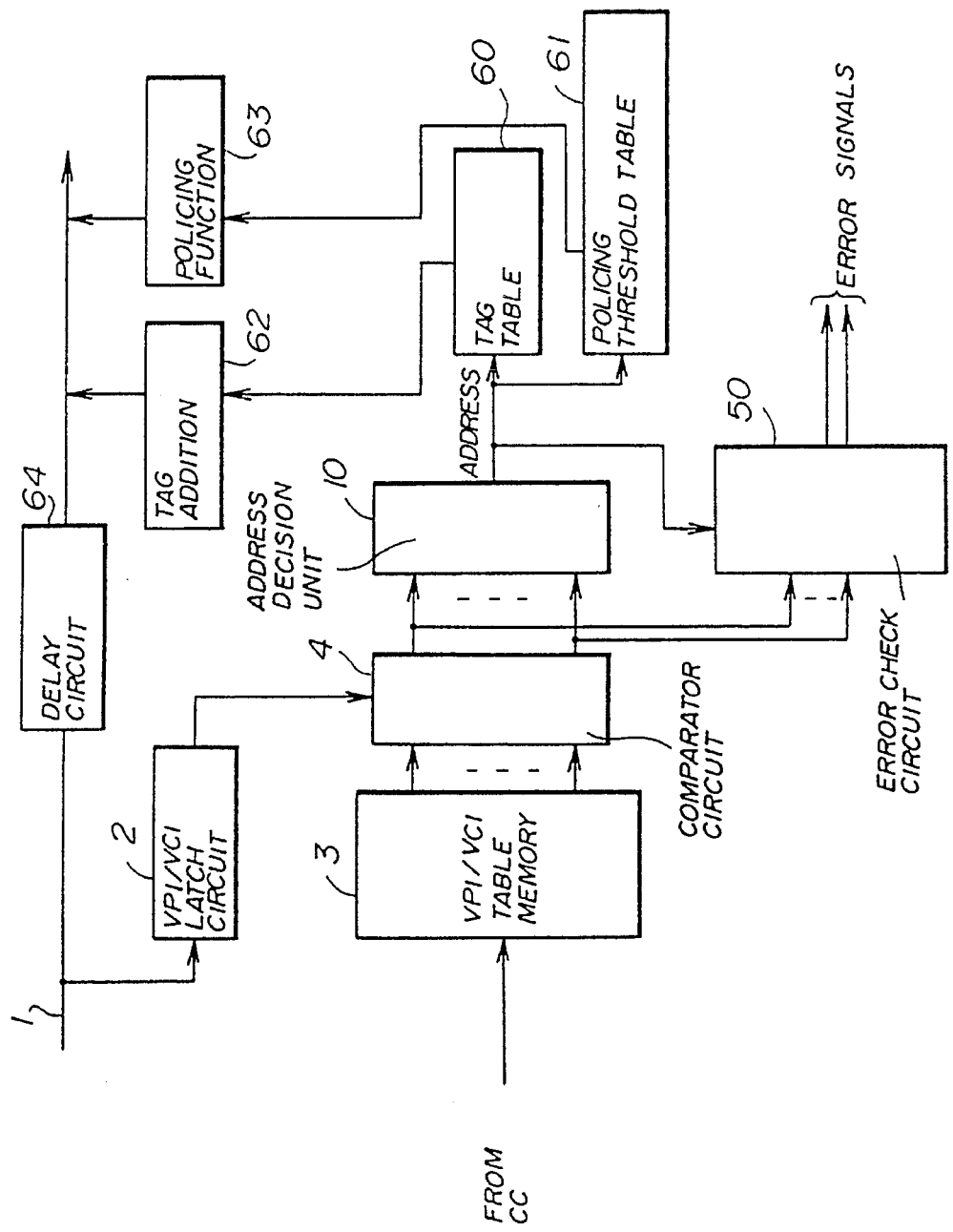
FIG. 11 is a block diagram showing a first application of the present invention.

FIG. 11 shows a first application of the present invention. The configuration shown in FIG. 11 is applied to each of the incoming trunks TRK 900. In FIG. 11, parts that are the same as parts shown in the previous figures are given the same reference numerals as previously. A delay circuit 64 is provided in the cell highway 1. A tag table memory 60 stores routing information for switching of cells. A policing threshold table memory 61 stores frequency band information concerning cells. A tag addition circuit 62 adds a tag to a cell by referring to the contents of the tag table memory 60. A policing function unit 63 adds a predetermined bit or bits to a cell on the cell highway, or activates a predetermined signal line when the frequency band used exceeds a policing threshold value read from the tag table memory 60.

As has been described previously, in the B-ISDN, a tag of cell routing information is managed for each VPI/VCI. Tags are respectively added to cells each time a cell is transferred via the cell highway 1. The tag table memory 60 is managed by the address output by the address decision circuit 10. A tag specified by the address from the address decision circuit 10 is read from the tag table memory 60 and transferred to the tag addition circuit 62. Reading the tag from the tag table memory 60 after the VPI/VCI value contained in a cell being transferred via the cell highway 1 is latched and the address related to the VPI/VCI value is output by the address decision circuit 10 takes time. Therefore the delay circuit 64 holds the cell for the above time. Then, the cell is output from the delay circuit 64, and the tag addition circuit 62 adds the tag to the readout cell. One of the policing threshold values specified by the address from the address decision circuit 10 is read out from the policing threshold table memory 61, and supplied to the policing function unit 63. Then, the policing function unit 63 determines whether or not the cell output from the delay circuit 64 has a frequency band which exceeds the policing threshold value. If the result of this determination is affirmative, the policing function unit 63 inserts a predetermined bit or bits into a predetermined bit position in the cell, or activates the predetermined signal line.

Figure 12:
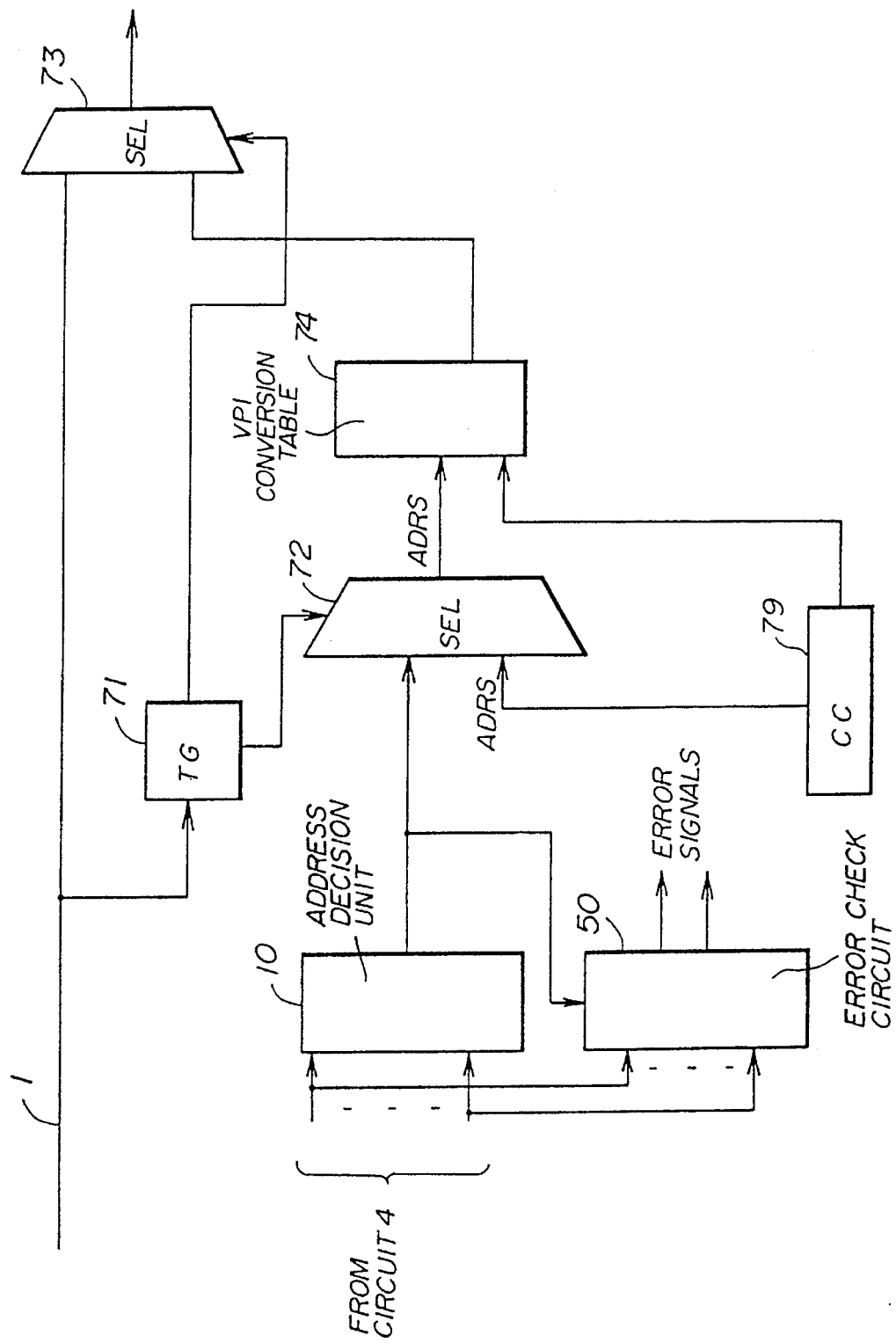
FIG. 12 is a block diagram showing a second application of the present invention.

FIG. 12 shows a second application of the present invention. The configuration shown in FIG. 12 is applied to the multiplexer MUX. The address generated by the address decision circuit 10 is used for accessing a VCI conversion table memory 74. A selector 72 selects either an address signal ADRS from the call processor CC 79 or the address signal from the address decision circuit 10 in accordance with a timing signal generated by a timing generator (TG) 71. The call processor CC writes new VCI values (data) related to routes directed to destinations into the VCI conversion table memory 74. Normally, the selector 72 selects the call processor 79. The timing generator 71 receives a cell transferred via the cell highway 1, and generates a pulse signal in response to a predetermined bit contained in the cell in a conventional manner. In response to receipt of this pulse signal, the selector 72 selects the address from the address decision circuit 10. The new VPI value specified by the address from the address decision circuit 10 is read from the VCI conversion table memory 74, and applied to a selector 73. The selector 73 selects either the cell highway 1 or the conversion table memory 74 in accordance with a timing signal generated by the timing generator 71 in a conventional manner. In this manner, the new VCI is inserted into the cell being considered.

The address decision system having the check system of the present invention can operate at a high speed, and is suitable for the B-ISDN required to operate at high speed. For example, the check system operates in synchronism with a 39 MHz clock signal (the ATM exchange has a bit rate of 622 MHz consisting of 16 39 MHz-systems in parallel), and generates the first and second error signals with one clock after the address is output from the address decision circuit 10.

The first and second error signals can be used for identifying a fault which has occurred in a hardware configuration in the ATM system.

The present invention can be configured by a combination of similar circuits, and can be highly integrated.

The present invention is not limited to the specifically disclosed embodiments. For example, the address decision circuit shown in FIG. 6 can be varied so that the five output bits assume "0" for the input address.

What is claimed is:

1. An address decision system in an Asynchronous Transfer Mode (ATM) exchange, comprising:

table memory means for storing data showing relationships between Virtual Path Identifier/Virtual Channel Identifier (VPI/VCI) values and addresses;

latch means, coupled to a cell highway, for latching a VPI/VCI value contained in a cell transferred via the cell highway;

comparator means, coupled to said table memory means and said latch means, for comparing the VPI/VCI values stored in the table memory means with the VPI/VCI value latched by said latch means and for generating a comparator output signal designating, in a normal operation, one of the addresses at which the VPI/VCI value from said latch means coincides with one of the VPI/VCI values in said table memory means;

encoding means, coupled to said comparator means, for encoding the comparator output signal and thereby generating an encoded signal, based on the comparator output signal, as the output thereof; and check means comprising:
    decoder means, coupled to said encoding means, for decoding the encoded signal and generating a decoded signal; and
    error checking means, coupled to said comparator means and said decoder means, for receiving the comparator output signal and the decoded signal and for generating an error signal when the comparator output signal and the decoded signal do not match each other.

2. An address decision system as claimed in claim 1, wherein:

n represents a value and m represents a value;

the comparator output signal comprises n bits respectively related to the addresses of said table memory means, and the encoded signal comprises m bits where m is smaller than n; and said encoding means comprises logic means for executing a predetermined encoding operation based on a relationship between the value of n and the value of m and for generating the encoded signal comprising m bits and indicating one of the addresses at which the VPI/VCI value from said latch means coincides with one of the VPI/VCI values in said table memory means.

3. An address decision system as claimed in claim 1, wherein:

the comparator output signal comprises n bits respectively related to the addresses of said table memory means; and said comparator means comprises means for setting one of said n bits to a first value, said one of the n bits corresponding to one of the addresses at which the VPI/VCI value from said latch means coincides with one of the VPI/VCI values in said table memory means and for respectively setting remaining bits (n-1) to a second value.

4. An address decision system as claimed in claim 3, wherein said check means comprises:

means for determining whether or not a plurality of bits among the n bits from said comparator means are respectively equal to the first value; and means for generating the error signal when said plurality of bits among the n bits from said comparator means are respectively equal to the first value.

5. An address decision system as claimed in claim 3, wherein said check means comprises:

means for determining whether an error which causes all the n bits from the comparator means to be the second value exists; and means for generating a second error signal in response to detection of the error which causes all the n bits from the comparator means to be the second value has occurred.

6. An address decision system as claimed in claim 1, wherein: m is a value and n is a value;

the comparator output signal comprises n bits respectively related to the addresses of said table memory means;

the encoded signal comprises m bits where m is smaller than n; and said encoding means comprises:

m first logic gates coupled to said comparator means for realizing said predetermined bits among the n bits from the comparator means in accordance with said predetermined encoding operation and outputting respective output signals;

m second logic gates respectively having first terminals for receiving a predetermined one of the n bits from the comparator means, second terminals for receiving the respective output signals of said m first logic gates and outputting m output signals; and m output signals of said m second logic gates forming the encoded signal.

7. An address decision system as claimed in claim 6, wherein said check means comprises:

first means for decoding the m output signals of said m second logic gates into a decoded address signal including n bits; and second means, coupled to said first means, for comparing the decoded address signal to said comparator output signal and for generating said error signal when the comparator output signal and the decoded address signal coincide with each other.

8. An address decision system as claimed in claim 7, wherein said check means comprises third means for receiving said predetermined one of the n bits from the comparator means and said m output signals of said m first logic gates and for generating another error signal based on said predetermined one of the n bits from the comparator means and said m output signals of said m first logic gates.

9. An address decision system as claimed in claim 8, wherein said third means comprises:

an inverter for inverting said predetermined one of the n bits from the comparator means; and an OR gate for receiving an output signal of said inverter and said m output signals of said m first logic gates and generating said a second error signal.

10. An address decision system as claimed in claim 6, wherein:

said m first logic gates respectively comprise NAND gates; and said m second logic gates respectively comprise AND gates.

11. An address decision system in a system which transfers packets having a fixed length, comprising:

table memory means for storing data showing relationships between channel identification values and addresses;

latch means, coupled to a cell highway, for latching a channel identification value contained in a cell transferred via the cell highway;

comparator means, coupled to said table memory means and said latch means, for comparing the channel identification values stored in the table memory means with the channel identification value latched by said latch means and for generating a comparator output signal designating, in a normal operation, one of the addresses at which the channel identification value from said latch means coincides with one of the channel identification values in said table memory means;

encoding means, coupled to said comparator means, for encoding the comparator output signal and thereby generating an encoded signal, based on the comparator output signal, as the output thereof; and check means comprising:

decoder means, coupled to said encoding means, for decoding the encoded signal and generating a decoded signal; and error checking means, coupled to said comparator means and said decoder means, for receiving the comparator output signal and the decoded signal and for generating an error signal when the comparator output signal and the decoded signal do not match each other.

12. An address decision system as claimed in claim 11, wherein said system which transfers packets having a fixed length is an Asynchronous Transfer Mode Exchange, and wherein said channel identification values are Virtual Path Identifier/Virtual Channel Identifier values.

* * * * *

UNITED STATES PATENT AND TRADEMARK OFFICE
CERTIFICATE OF CORRECTION

PATENT NO. : 5,459,743
DATED : Oct. 17, 1995
INVENTOR(S) : FUKUDA et al.

It is certified that error appears in the above-indentified patent and that said Letters Patent is hereby corrected as shown below:

Col. 1, line 22, change "considered; policing" to --considered. Policing--.

Col. 3, line 44, change "unit 39" to --circuit 39--;
line 49, change "unit 39" to --circuit 39--.

Col. 4, line 58, change "3" to --13--.

Col. 7, line 49, after "Therefore" insert --,--.

Signed and Sealed this

Fourth Day of June, 1996

Attest:

BRUCE LEHMAN

*Attesting Officer*    *Commissioner of Patents and Trademarks*